(12) United States Patent
Yamamoto

(10) Patent No.: US 9,162,675 B2
(45) Date of Patent: Oct. 20, 2015

(54) CONTROL DEVICE OF HYBRID SYSTEM

(75) Inventor: Masaya Yamamoto, Kasugai (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/343,972

(22) PCT Filed: Dec. 13, 2011

(86) PCT No.: PCT/JP2011/078780
§ 371 (c)(1),
(2), (4) Date: Mar. 10, 2014

(87) PCT Pub. No.: WO2013/088509
PCT Pub. Date: Jun. 20, 2013

(65) Prior Publication Data
US 2014/0371963 A1    Dec. 18, 2014

(51) Int. Cl.
| | |
|---|---|
| *B60L 11/00* | (2006.01) |
| *B60W 20/00* | (2006.01) |
| *B60W 10/06* | (2006.01) |
| *B60W 10/08* | (2006.01) |
| *B60K 6/48* | (2007.10) |
| *B60K 26/04* | (2006.01) |

(52) U.S. Cl.
CPC ................ *B60W 20/40* (2013.01); *B60K 6/48* (2013.01); *B60W 10/06* (2013.01); *B60W 10/08* (2013.01); *B60W 20/10* (2013.01); *B60K 2026/046* (2013.01); *B60W 2540/10* (2013.01); *Y02T 10/6221* (2013.01); *Y02T 10/6286* (2013.01); *Y10S 903/93* (2013.01)

(58) Field of Classification Search
USPC ............................ 701/22, 36, 53, 54, 99, 101
See application file for complete search history.

(56) References Cited

U.S. PATENT DOCUMENTS

| | | | |
|---|---|---|---|
| 2008/0173485 A1 | 7/2008 | Kumazaki et al. | |
| 2008/0234096 A1* | 9/2008 | Joshi et al. | 477/3 |
| 2009/0101421 A1* | 4/2009 | Oyobe et al. | 180/65.29 |

FOREIGN PATENT DOCUMENTS

| | | |
|---|---|---|
| JP | 2005110469 A | 4/2005 |
| JP | 2007-091073 A | 4/2007 |
| JP | 2008-126901 A | 6/2008 |
| JP | 2008-174159 A | 7/2008 |
| JP | 2008-230409 A | 10/2008 |
| JP | 2008-296619 A | 12/2008 |

* cited by examiner

*Primary Examiner* — Kim T Nguyen
(74) *Attorney, Agent, or Firm* — Sughrue Mion, PLLC

(57) ABSTRACT

The invention relates to a control device of a hybrid system. The control device selectively performs first and second modes for concomitantly using an EV mode for operating the electric motor (12) with the engine operation being stopped and an HV mode for selectively operating the engine and stopping the engine operation with the electric motor being operated by switching the EV and HV modes according to a predetermined switching condition set such that a proportion of an engine operation time in the first mode is smaller than that in the second mode. When an actual acceleration pedal manipulation amount is smaller than a first manipulation amount, an amount of the hybrid system power increased according to the increasing of the actual acceleration pedal manipulation amount in the first mode is made larger than that in the second mode.

9 Claims, 11 Drawing Sheets

CONTROL DEVICE OF HYBRID SYSTEM

CROSS REFERENCE TO RELATED APPLICATIONS

This application is a National Stage of International Application No. PCT/JP2011/078780, filed on Dec. 13, 2011, the contents of all of which are incorporated herein by reference in their entirety.

TECHNICAL FIELD

The invention relates to a control device of a hybrid system.

BACKGROUND ART

In the Patent Document 1, a hybrid system is described, which hybrid system can output a power output from an internal combustion engine by its operation and a power output from an electric motor by its operation simultaneously or selectively.

In this hybrid system, a mode for selectively performing the operation of the engine and the electric motor and the stop of the operation (hereinafter, this mode may be referred to as—HV mode—) and a mode for performing the operation of the electric motor and the stop of the operation of the engine (hereinafter, this mode may be referred to as—EV mode—) are selectively performed.

In this hybrid system, a power depending on an actual acceleration pedal manipulation amount is output from the hybrid system.

In the hybrid system described in the Patent Document 1, a required hybrid system power value (i.e. a value of the power required as a power output from the hybrid system) is calculated on the basis of the actual acceleration pedal manipulation amount and when the thus calculated required hybrid system power value is smaller than a certain threshold value, the EV mode is selected and on the other hand, when the aforementioned calculated required power value is larger than the aforementioned threshold value, the HV mode is selected.

In this regard, in the hybrid system described in the Patent Document 1, in order to facilitate the selection of the EV mode at the EV mode selection being required (i.e. when it is required that the EV mode is selected), the power output from the hybrid system on the basis of the actual acceleration pedal manipulation amount at the EV mode selection being required is made smaller than that at the HV mode selection being required.

PRIOR ART DOCUMENT

Patent Document

[PATENT DOCUMENT 1] Unexamined JP Patent Publication No. 2008-296619
[PATENT DOCUMENT 2] Unexamined JP Patent Publication No. 2008-174159
[PATENT DOCUMENT 3] Unexamined JP Patent Publication No. 2008-126901
[PATENT DOCUMENT 4] Unexamined JP Patent Publication No. 2007-91073
[PATENT DOCUMENT 5] Unexamined JP Patent Publication No. 2008-230409

SUMMARY OF THE INVENTION

Problem to be Solved by the Invention

In the hybrid system described in the Patent Document 1, in the case that it is required that the EV mode is selected, when the actual acceleration pedal manipulation amount is relatively small, the hybrid system power (i.e. the power output from the hybrid system) is smaller than that on the same acceleration pedal manipulation amount at the HV mode being selected.

Thus, for example, within a small acceleration pedal manipulation amount range (i.e. a range wherein the actual acceleration pedal manipulation amount is relatively small), the hybrid system power when the actual acceleration pedal manipulation amount is increased is small.

This is not preferred in order to obtain a specific torque feeling of the electric motor within the small acceleration pedal manipulation amount range at the EV mode being selected (i.e. when the EV mode is selected).

In addition, this is applied to a hybrid system for selectively performing a mode for selectively performing the operation of the engine and the stop thereof while the electric motor is operated, in which mode, a proportion of a time of the engine operation occupying the total time of the mode being relatively small (hereinafter, this mode may be referred to as—small proportion mode—) and a mode for selectively performing the operation of the engine and the stop thereof while the electric motor is operated, in which mode, a proportion of a time of the engine operation occupying the total time of the mode being relatively large.

The object of the invention is to obtain the specific torque feeling within the small acceleration pedal manipulation amount range at the small proportion mode or the EV mode being selected.

Means for Solving the Problem

The invention of this application relates to a control device of a hybrid system which can output a power output from an internal combustion engine by its operation and a power output from an electric motor by its operation selectively or simultaneously, the control device selectively performing first and second modes for concomitantly using an EV mode for performing the operation of the electric motor with the operation of the engine being stopped and an HV mode for selectively performing the operation of the engine and its stop with the electric motor being operated by switching the EV mode and the HV mode according to a predetermined switching condition, and the predetermined switching condition being set such that a proportion of an operation time of the engine occupying a total time of the first mode is smaller than that occupying a total time of the second mode.

In this regard, in this invention, referring to the power output from the hybrid system as hybrid system power, when the first mode is selected and an actual acceleration pedal manipulation amount is smaller than a predetermined first manipulation amount, an increase amount of the hybrid system power relative to the increase amount of the actual acceleration pedal manipulation amount is made larger than that when the second mode is selected.

According to this invention, the following effect can be obtained.

That is, in this invention, when the actual acceleration pedal manipulation amount is within a range wherein the actual acceleration pedal manipulation amount is relatively small (i.e. a range wherein the actual acceleration pedal manipulation amount is smaller than the first manipulation amount and hereinafter, this range may be referred to as—small acceleration pedal manipulation amount range—) at the first mode being selected, the increase amount of the hybrid system power relative to the increase amount of the actual acceleration pedal manipulation amount (hereinafter, this increase amount may be simply referred to as—hybrid system power increase amount—) is larger than that within the small acceleration pedal manipulation amount range at the second mode being selected.

Therefore, in the case that the actual acceleration pedal manipulation amount is increased within a relatively small range (i.e. a range smaller than the first manipulation amount) at the first mode being selected, the increase of hybrid system power is large, compared with the case that the actual acceleration pedal manipulation amount is increased at the second mode being selected.

Thus, according to this invention, the effect that the specific torque feeling of the electric motor can be obtained within the small acceleration pedal manipulation amount range at the first mode being selected, can be obtained.

According to the further invention of this application, in the aforementioned invention, when the actual acceleration pedal manipulation amount is smaller than the first manipulation amount, the increase amount of the hybrid system power relative to the increase amount of the actual acceleration pedal manipulation amount when the EV mode is selected at the first mode is equal to that when the HV mode is selected at the first mode.

Further, according to the further invention of this application, in the aforementioned invention, referring to the value of the power required as the hybrid system power as required hybrid system power value, in the case that when the required hybrid system power value is smaller than or equal to a predetermined first power value, the first mode is selected and on the other hand, when the required hybrid system power value is larger than the first power value, the second mode is selected, when the first mode is selected and the actual acceleration pedal manipulation amount is larger than or equal to the first manipulation amount and is smaller than a predetermined second manipulation amount smaller than the maximum value of the actual acceleration pedal manipulation amount, the increase amount of the hybrid system power relative to the increase amount of the actual acceleration pedal manipulation amount is made smaller than that when the second mode is selected and the hybrid system power at around the second manipulation amount is made smaller than that when the second mode is selected.

According to this invention, the following effect can be obtained.

That is, in this invention, when the actual acceleration pedal manipulation amount is within a medium degree range (i.e. a range wherein the actual acceleration pedal manipulation amount is larger than or equal to the first manipulation amount and smaller than the second manipulation amount and hereinafter, this range may be referred to as—medium acceleration pedal manipulation amount range—) at the first mode being selected, the increase amount of the hybrid system power is smaller than that within the medium acceleration pedal manipulation amount range at the second mode being selected and the hybrid system power at around the second manipulation amount is smaller than that at around the second manipulation amount within the medium acceleration pedal manipulation amount range at the second mode being selected.

Therefore, even if the actual acceleration pedal manipulation amount is increased within a medium degree range (i.e. a range from an amount equal to or larger than the first manipulation amount to an amount smaller than the second manipulation amount) at the first mode being selected, the required hybrid system power value does not easily become larger than the first power value and as a result, the first mode is not easily switched to the second mode.

Thus, according to this invention, the effect that the selection of the first mode is easily maintained at the first mode being selected can be obtained.

Further, according to the further invention of this application, in the aforementioned invention, referring to the value of the power required as the power output from the electric motor as required electric motor power value, when the required electric motor power value is larger than a predetermined second power value, even when the first mode is selected and the actual acceleration pedal manipulation amount is smaller than the first manipulation amount, the increase amount of the hybrid system power relative to the increase amount of the actual acceleration pedal manipulation amount is made equal to that when the second mode is selected.

According to this invention, the following effect can be obtained.

That is, if the required power value increase rate is large when the required electric motor power value at the first mode being selected, there is a possibility that the load imposed on the electric motor excessively increases and this is not preferred in the point of view of the protection of the electric motor.

In this regard, in this invention, when the required electric motor power value is relatively large, the increase amount of the hybrid system power within the small acceleration pedal manipulation amount range at the first mode being selected is equal to that at the second mode being selected.

Thus, according to this invention, the effect that the excessive large load imposed on the electric motor is restricted when the required electric motor power value is relatively large at the first mode being selected can be obtained.

Further, according to the further invention of this application, in the aforementioned invention, when the first mode is selected and the actual acceleration pedal manipulation amount is smaller than the first manipulation amount, the hybrid system power is made larger than that when the second mode is selected.

According to this invention, the following effect can be obtained.

That is, in this invention, the hybrid system power within the small acceleration pedal manipulation amount range at the first mode being selected is larger than that of the second mode.

Thus, according to this invention, the effect that it is ensured that the specific torque feeling of the electric motor can be obtained within the small acceleration pedal manipulation amount range at the first mode being selected can be obtained.

The invention of this application relates to a control device of a hybrid system which can output a power output from an internal combustion engine by its operation and a power output from an electric motor by its operation selectively or simultaneously, the control device selectively performing an EV mode for performing the operation of the electric motor with the operation of the engine being stopped and an HV mode for selectively performing the operation of the engine and its stop with the electric motor being operated.

In this regard, in this invention, referring to the power output from the hybrid system as hybrid system power, when the EV mode is selected and an actual acceleration pedal manipulation amount is smaller than a predetermined first manipulation amount, an increase amount of the hybrid system power relative to the increase amount of the actual acceleration pedal manipulation amount is made larger than that when the HV mode is selected.

According to this invention, the following effect can be obtained.

That is, in this invention, when the actual acceleration pedal manipulation amount is within a range wherein the actual acceleration pedal manipulation amount is relatively (i.e. a range wherein the actual acceleration pedal manipulation amount is smaller than the first manipulation amount and hereinafter, this range may be referred to as—small acceleration pedal manipulation amount range—) at the EV mode being selected, the increase amount of the hybrid system power is larger than that within the small acceleration pedal manipulation amount range at the HV mode being selected.

Therefore, in the case that the actual acceleration pedal manipulation amount is increased within a relatively small range (i.e. a range smaller than the first manipulation amount) at the EV mode being selected, the increase of hybrid system power is large, compared with the case that the actual acceleration pedal manipulation amount is increased at the HV mode being selected.

Thus, according to this invention, the effect that the specific torque feeling of the electric motor can be obtained within the small acceleration pedal manipulation amount range at the EV mode being selected, can be obtained.

Further, according to the further invention of this application, in the aforementioned invention, referring to the value of the power required as the hybrid system power as required hybrid system power value, in the case that when the required hybrid system power value is smaller than or equal to a predetermined first power value, the EV mode is selected and on the other hand, when the required hybrid system power value is larger than the first power value, the HV mode is selected, when the EV mode is selected and the actual acceleration pedal manipulation amount is larger than or equal to the first manipulation amount and is smaller than a predetermined second manipulation amount smaller than the maximum value of the actual acceleration pedal manipulation amount, the increase amount of the hybrid system power relative to the increase amount of the actual acceleration pedal manipulation amount is made smaller than that when the HV mode is selected and the hybrid system power at around the first manipulation amount is made smaller than that when the HV mode is selected.

According to this invention, the following effect can be obtained.

That is, in this invention, when the actual acceleration pedal manipulation amount is within a medium degree range (i.e. a range wherein the actual acceleration pedal manipulation amount is larger than or equal to the first manipulation amount and smaller than the second manipulation amount and hereinafter, this range may be referred to as—medium acceleration pedal manipulation amount range—) at the EV mode being selected, the increase amount of the hybrid system power is smaller than that within the medium acceleration pedal manipulation amount range at the HV mode being selected and the hybrid system power at around the second manipulation amount is smaller than that at the HV mode being selected.

Therefore, even if the actual acceleration pedal manipulation amount is increased within a medium degree range (i.e. a range from an amount equal to or larger than the first manipulation amount to an amount smaller than the second manipulation amount) at the EV mode being selected, the required hybrid system power value does not easily become larger than the first power value and as a result, the EV mode is not easily switched to the HV mode.

Thus, according to this invention, the effect that the selection of the EV mode is easily maintained at the EV mode being selected can be obtained.

Further, according to the further invention of this application, in the aforementioned invention, referring to the value of the power required as the power output from the electric motor as required electric motor power value, when the required electric motor power value is larger than a predetermined second power value, even when the EV mode is selected and the actual acceleration pedal manipulation amount is smaller than the first manipulation amount, the increase amount of the hybrid system power relative to the increase amount of the actual acceleration pedal manipulation amount is made equal to that when the HV mode is selected.

According to this invention, the following effect can be obtained.

That is, if the required power value increase rate is large when the required electric motor power value at the EV mode being selected, there is a possibility that the load imposed on the electric motor excessively increases and this is not preferred in the point of view of the protection of the electric motor.

In this regard, in this invention, when the required electric motor power value is relatively large, the increase amount of the hybrid system power within the small acceleration pedal manipulation amount range at the EV mode being selected is equal to that at the HV mode being selected.

Thus, according to this invention, the effect that the excessive large load imposed on the electric motor is restricted when the required electric motor power value is relatively large at the EV mode being selected can be obtained.

Further, according to the further invention of this application, in the aforementioned invention, when the EV mode is selected and the actual acceleration pedal manipulation amount is smaller than the first manipulation amount, the hybrid system power is made larger than that when the HV mode is selected.

According to this invention, the following effect can be obtained.

That is, in this invention, the hybrid system power within the small acceleration pedal manipulation amount range at the EV mode being selected is larger than that at the HV mode being selected.

Thus, according to this invention, the effect that it is ensured that the specific torque feeling of the electric motor can be obtained within the small acceleration pedal manipulation amount range at the EV mode being selected can be obtained.

DETAILED DESCRIPTION OF THE EXEMPLARY EMBODIMENTS

Figure 1:
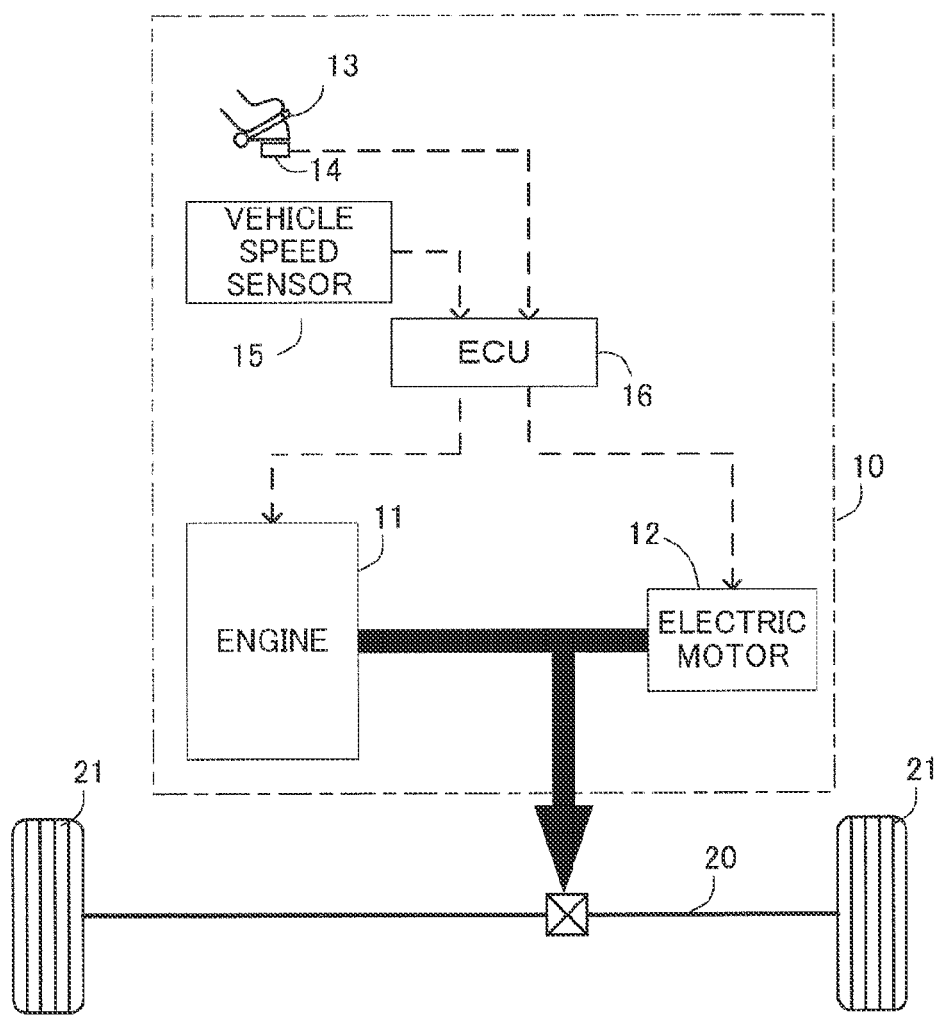
FIG. 1 is a view showing a vehicle incorporating a hybrid system which a control device of the invention is applied.

Below, embodiments of the invention will be explained. A vehicle incorporating a hybrid system which a control device of one embodiment of the invention (hereinafter, this embodiment may be referred to as—first embodiment—) is applied, is shown in FIG. 1.

The hybrid system 10 of the first embodiment at least comprises an internal combustion engine 11, an electric motor 12, an acceleration pedal 13, an acceleration pedal manipulation amount sensor 14, a vehicle speed sensor 15 and an electronic control unit (ECU) 16.

The engine 11 is operated by a combustion of a fuel to output a power and as this engine 11, for example, a spark ignition type of an internal combustion engine (i.e. a gasoline engine) or a compression self-ignition type of an internal combustion engine (i.e. a diesel engine) can be employed.

The electric motor 12 is operated by an electrical power to output a power. The electric motor 12 functions as a electrical power generator for generating an electrical power by a power input thereto.

The hybrid system 10 of the first embodiment can output a power output from the engine 11 by its operation and a power output from the electric motor 12 by its operation selectively or simultaneously, and selectively performs two modes for concomitantly using a mode for performing the operation of the electric motor 12 with the operation of the engine 11 being stopped (hereinafter, this mode may be referred to as—EV mode—) and a mode for selectively performing the operation of the engine 11 and its stop with the electric motor 12 being operated (hereinafter, this mode may be referred to as—HV mode—) by switching the EV mode and the HV mode according to a predetermined switching condition.

That is, when one of these modes is selected, the EV and HV modes are switched according to the predetermined switching condition for this one mode and on the other hand, when the other mode is selected, the EV and HV modes are switched according to the predetermined switching condition for this other mode.

In this regard, in the first embodiment, the predetermined switching conditions for the one mode and the other mode are set such that the proportion of the operation time of the engine occupying the total time of one of the modes is smaller than that occupying the total time of the other mode.

In the following explanation, the aforementioned one mode (i.e. the mode wherein the proportion of the operation time of the engine occupying the total time of this mode is relatively small) will be referred to as—small proportion mode—and the aforementioned other mode (i.e. the mode wherein the proportion of the operation time of the engine occupying the total time of this mode is relatively large) will be referred to as—large proportion mode—.

Further, as the predetermined switching condition, for example, a battery storage amount (i.e. an amount of an electric power stored in a battery for supplying the electric power to the electric motor), an acceleration pedal manipulation amount, a vehicle speed (i.e. a speed of the vehicle), a required power (i.e. a power required as a power output from the hybrid system), a condition relating to the requirement from an air conditioning equipment of the vehicle, etc. can be employed.

In the first embodiment, even in the case that the large proportion mode is selected or even in the case that the small proportion mode is selected, when the engine 11 is operated with the electric motor 12 being operated, the power output from the electric motor 12 and the power output from the engine 11 are output simultaneously from the hybrid system and on the other hand, when the operation of the engine 11 is stopped with the electric motor 12 being operated, the power output from the electric motor 12 is output from the hybrid system 10.

In the first embodiment, the power output from the hybrid system 10 is input to a driving shaft 20. The driving shaft 20 is connected to driving wheels 21 of the vehicle and these driving wheels 21 of the vehicle are rotated by the power input from the hybrid system 10 to the driving shaft 20.

Further, as the hybrid system of the first embodiment, for example, a series type of a hybrid system or a parallel type of a hybrid system or a series-parallel type of a hybrid system can be employed.

The acceleration pedal manipulation amount sensor 14 output an output value corresponding to an acceleration pedal manipulation amount (i.e. a manipulation amount of the acceleration pedal 13). The output value output from the acceleration pedal manipulation amount sensor 14 is input to the electronic control unit 16.

The electronic control unit 16 calculates a required torque on the basis of the output value input from the acceleration pedal manipulation amount sensor 14. The required torque means—a torque required as a torque output from the hybrid system.

The vehicle speed sensor 15 outputs an output value corresponding to a vehicle speed (i.e. a speed of the vehicle). The output value output from the vehicle speed sensor 15 is input to the electronic control unit 16. The electronic control unit 16 calculates the vehicle speed on the basis of the output value input from the vehicle speed sensor 15.

Then, the electronic control unit 16 calculates a required hybrid system power value on the basis of the calculated required torque and the calculated vehicle speed. The required hybrid system power value means—a value of the power required as a power output from the hybrid system—.

Then, the electronic control unit 16 controls the operations of the electric motor 12 and the engine 11 such that the power of the required hybrid system power value is output from the hybrid system 10 by the powers output from the electric motor 12 and the engine 11 even in the case that the large proportion mode is selected and even in the case that the small proportion mode is selected.

Next, a hybrid system power control (i.e a control of the power output from the hybrid system) of the first embodiment will be explained. In the following explanation, the "hybrid system power" means—a power output from the hybrid system—and the "hybrid system power increase amount" means—an increase amount of the hybrid system power relative to the increase amount of the actual acceleration pedal manipulation amount—.

In the first embodiment, in the case that the small proportion mode is selected, when the actual acceleration pedal manipulation amount is smaller than a predetermined manipulation amount (hereinafter, this manipulation amount may be referred to as—predetermined small manipulation amount—), the hybrid system power increase amount is made larger than that in the case that the large proportion mode is selected.

According to the first embodiment, the following effect can be obtained.

That is, in the first embodiment, when the actual acceleration pedal manipulation amount is within a relatively small range (i.e a range wherein the actual acceleration pedal manipulation amount is smaller than the predetermined small manipulation amount and hereinafter, this range may be referred to as—small acceleration pedal manipulation amount range—) at the small proportion mode being selected, the hybrid system power increase amount is made larger than that within the small acceleration pedal manipulation amount range at the large proportion mode being selected.

Therefore, in the case that the actual acceleration pedal manipulation amount is increased within a relatively small range (i.e. a range smaller than the predetermined small manipulation amount) at the small proportion mode being selected, the increase of hybrid system power is large, compared with the case that the actual acceleration pedal manipulation amount is increased at the large proportion mode being selected.

Thus, according to the first embodiment, the effect that the specific torque feeling of the electric motor can be obtained within the small acceleration pedal manipulation amount range at the small proportion mode being selected, can be obtained.

In addition, according to the first embodiment, the following effect can be obtained.

That is, as explained above, according to the first embodiment, in the case that the actual acceleration pedal manipulation amount is increased within the relatively small range at the small proportion mode being selected, the torque is output from the hybrid system at a high increase rate, compared with the case that the actual acceleration pedal manipulation amount is increased at the large proportion mode being selected.

Thus, it is restricted that the operator of the acceleration pedal feels an shortage of the increase of the torque output from the hybrid system and as a result, it is restricted that the operator of the acceleration pedal further increases the acceleration pedal manipulation amount.

Thus, the effect that it is restricted that the small proportion mode is switched to the large proportion mode and therefore, the frequency of the operation of the engine decreases and as a result, it is restricted that the fuel consumption of the engine increases.

In the first embodiment, in the case that the small proportion mode is selected, when the actual acceleration pedal manipulation amount is smaller than the predetermined small manipulation amount, the hybrid system power increase amount may be made larger than that when the large proportion mode is selected and the hybrid system power may be made larger than that when the large proportion mode is selected.

Figure 2:
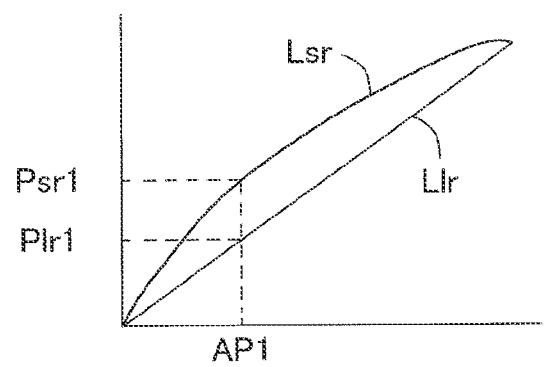
FIG. 2 is a view showing a relationship which can be employed as a relationship between an actual acceleration pedal manipulation amount and a hybrid system power in a first embodiment.

The relationship between the actual acceleration pedal manipulation amount and the hybrid system power in this case is shown in FIG. 2.

In FIG. 2, the abscissa axis indicates the actual acceleration pedal manipulation amount, the longitudinal axis indicates the hybrid system power, the line Lsr indicates a relationship between the actual acceleration pedal manipulation amount and the hybrid system power when the small proportion mode is selected, the line Llr indicates a relationship between the acceleration pedal manipulation amount and the hybrid system power when the large proportion mode is selected, the acceleration manipulation amount AP1 indicates the predetermined small manipulation amount, the hybrid system power Psr1 indicates the hybrid system power when the actual acceleration pedal manipulation amount is equal to the predetermined small manipulation amount AP1 in the case that the small proportion mode is selected and the hybrid system power Plr1 indicates the hybrid system power when the actual acceleration pedal manipulation amount is equal to the predetermined small manipulation amount AP1 in the case that the large proportion mode is selected.

As means for changing the hybrid system power, various means may be employed and for example, the change of the acceleration pedal depression amount used for the calculation of the required torque, the change of the required torque calculated on the basis of the actual acceleration pedal depression amount, the change of the required hybrid system power value calculated on the basis of the actual acceleration pedal depression amount, the change of the torque required as the torque output from the electric motor, the change of the opening degree of the throttle valve required as the opening degree of the throttle valve of the engine, etc. may be employed.

Figure 3:
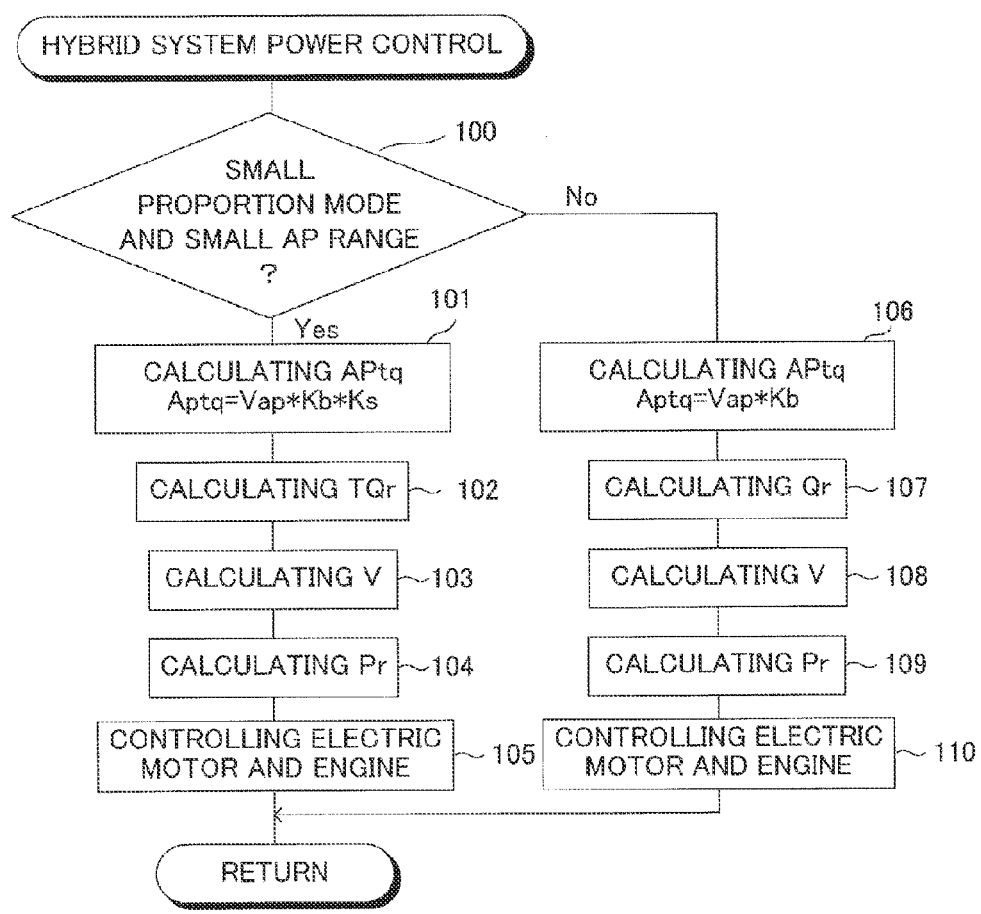
FIG. 3 is a view showing an example of a routine for performing a hybrid system power control according to the first embodiment.

Next, an example of a routine for performing a hybrid system power control according to the first embodiment will be explained. This example of the routine is shown in FIG. 3. This routine starts every a predetermined time has elapsed.

When the routine of FIG. 3 starts, first, at the step 100, it is judged if the small proportion mode is selected and the actual acceleration pedal manipulation amount is within the small acceleration pedal manipulation amount range.

In this regard, when it is judged that the small proportion mode is selected and the actual acceleration pedal manipulation amount is within the small acceleration pedal manipulation amount range, the routine proceeds to the step 101.

On the other hand, when it is judged that the small proportion mode is not selected or the actual acceleration pedal manipulation amount is not within the small acceleration pedal manipulation amount range, the routine proceeds to the step 106.

At the step 101, the acceleration pedal manipulation amount APtq for the required torque calculation is calculated according to the following equation 1.

In the equation 1, "Vap" is—output value output from the acceleration pedal manipulation amount sensor—, "Kb" is—transforming coefficient for transforming to the acceleration pedal manipulation amount for the required torque calculation, the output value output from the acceleration pedal manipulation amount sensor when the small proportion mode is not selected or when the actual acceleration pedal manipulation amount is not within the small acceleration pedal manipulation amount range—, "Ks" is—correcting value for correcting the output value Vap transformed by the transforming coefficient Kb when the small proportion mode is selected and the actual acceleration pedal manipulation amount is within the small acceleration pedal manipulation amount range—and this correcting coefficient is larger than "1".

$$APtq=Vap*Kb*Ks \quad (1)$$

Next, at the step 102, the required torque TQr is calculated on the basis of the acceleration pedal manipulation amount APtq for the required torque calculation calculated at the step 101.

Next, at the step 103, the vehicle speed V is calculated.

Next, at the step 104, the required hybrid system power value Pr is calculated on the basis of the acceleration pedal manipulation amount APtq for the required torque calculation calculated at the step 102 and the vehicle speed V calculated at the step 102.

Next, at the step 105, the electric motor and the engine are controlled such that the power of the required hybrid system power value Pr calculated at the step 104 is output from the hybrid system and thereafter, the routine ends.

On the other hand, at the step 106, the acceleration pedal manipulation amount APtq for the required torque calculation is calculated according to the following equation 2.

In the equation 2, "Vap" is the same as—Vap—in the equation 1 and "Kb" is the same as—Kb—in the equation 1.

Further, the acceleration pedal manipulation amount APtq for the required torque calculation calculated according to the equation 2 is equal to the actual acceleration pedal manipulation amount.

$$APtq=Vap*Kb \quad (2)$$

Next, at the step 107, the required torque TQr is calculated on the basis of the acceleration pedal manipulation amount APtq for the required torque calculation calculated at the step 106.

Next, at the step 108, the vehicle speed V is calculated.

Next, at the step 109, the required hybrid system power value Pr is calculated on the basis of the required torque TQr calculated at the step 107 and the vehicle speed V calculated at the step 108.

Next, at the step 110, the electric motor and the engine are controlled such that the power of the required hybrid system power value Pr calculated at the step 109 is output from the hybrid system and thereafter, the routine ends.

In the first embodiment, within the all acceleration pedal manipulation amount range (or at least within the small acceleration pedal manipulation amount range), it is preferred that the hybrid system power increase amount when the EV mode at the small proportion mode is selected is equal to that when the HV mode at the small proportion mode is selected.

Further, in the first embodiment, within the all acceleration pedal manipulation amount range (or at least within the small acceleration pedal manipulation amount range), it is preferred that the hybrid system power increase amount when the EV mode at the large proportion mode is selected is equal to that when the HV mode at the large proportion mode is selected.

Next, the second embodiment will be explained. The constitution and control of the second embodiment not explained below are the same as those of the first embodiment or those introduced from the constitution and control of the first embodiment in consideration of the constitution and control of the second embodiment explained below.

In the second embodiment, when the required hybrid system power value is equal to or smaller than a predetermined hybrid system power value (hereinafter, this value may be referred to as—predetermined hybrid system power value—), the small proportion mode is selected.

On the other hand, when the required hybrid system power value is larger than the predetermined hybrid system power value, the large proportion mode is selected.

Further, in the second embodiment, in the case that the small proportion mode is selected, when the actual acceleration pedal manipulation amount is smaller than the predetermined small manipulation amount, similar to the first embodiment, the hybrid system power increase amount is made larger than that in the case that the large proportion mode is selected.

Further, in the second embodiment, in the case that the small proportion mode is selected, when the actual acceleration pedal manipulation amount is equal to or larger than the predetermined small manipulation amount and is smaller than a manipulation amount (hereinafter, this amount may be referred to as—predetermined large manipulation amount—) smaller than the maximum value of the actual acceleration pedal manipulation amount (i.e. the possible maximum value of the actual acceleration pedal manipulation amount), the hybrid system power increase amount is made smaller than that in the case that the large proportion mode is selected and the hybrid system power at around the predetermined large manipulation amount is made smaller than that at the large proportion mode being selected.

According to the second embodiment, the following effect can be obtained in addition to the effect explained relating to the first embodiment.

That is, in the second embodiment, when the actual acceleration pedal manipulation amount is within a medium degree range (i.e. a range wherein the actual acceleration pedal manipulation amount is larger than or equal to the predetermined small manipulation amount and smaller than the predetermined large manipulation amount and hereinafter, this range may be referred to as—medium acceleration pedal manipulation amount range—) at the small proportion mode being selected, the hybrid system power increase amount is made smaller than that within the medium acceleration pedal manipulation amount range at the large proportion mode being selected and the hybrid system power at around the predetermined large manipulation amount is smaller than that at around the predetermined large manipulation amount within the medium acceleration pedal manipulation amount range at the large proportion mode being selected.

Therefore, even if the actual acceleration pedal manipulation amount is increased within a medium degree range (i.e. a range from an amount equal to or larger than the predetermined small manipulation amount to an amount smaller than the predetermined large manipulation amount) at the small proportion mode being selected, the required hybrid system power value does not easily become larger than the predetermined hybrid system power value and as a result, the small proportion mode is not easily switched to the large proportion mode.

Thus, according to the second embodiment, the effect that the selection of the small proportion mode is easily maintained at the small proportion mode being selected can be obtained.

In the second embodiment, in the case that the small proportion mode is selected, when the actual acceleration pedal manipulation amount is within the medium acceleration pedal manipulation amount range, the hybrid system power increase amount may be made smaller than that within the medium acceleration pedal manipulation amount range in the case that the large proportion mode is selected, the hybrid system power at around the predetermined large manipulation amount may be made smaller than that at around the predetermined large manipulation amount within the medium acceleration pedal manipulation amount range at the large proportion mode being selected, and the hybrid system power at around the predetermined small manipulation amount may be made larger than that at around the predetermined small manipulation amount within the medium acceleration pedal manipulation amount range at the large proportion mode being selected.

Further, in the second embodiment, in the case that the small proportion mode is selected, when the actual acceleration pedal manipulation amount is within a relatively large range (i.e. a range wherein the actual acceleration pedal manipulation amount is equal to or larger than the predetermined large manipulation amount and hereinafter, this range may be referred to as—large acceleration pedal manipulation amount range—), the hybrid system power increase amount may be made larger than that within the large acceleration pedal manipulation amount range in the case that the large proportion mode is selected, the hybrid system power may be made smaller than that corresponding to the same acceleration pedal amount at the large proportion mode being selected and the hybrid system power when the actual acceleration pedal manipulation amount reaches its maximum value may be made equal to that corresponding to the same acceleration pedal manipulation amount at the large proportion mode being selected.

Figure 4:
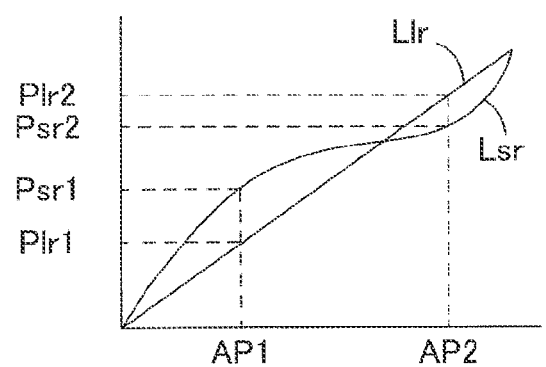
FIG. 4 is a view showing a relationship which can be employed as a relationship between an actual acceleration pedal manipulation amount and a hybrid system power in a second embodiment.

The relationship between the actual acceleration pedal manipulation amount and the hybrid system power in this case is shown in FIG. 4.

In FIG. 4, the abscissa axis indicates the actual acceleration pedal manipulation amount, the longitudinal axis indicates the hybrid system power, the line Lsr indicates a relationship between the actual acceleration pedal manipulation amount and the hybrid system power when the small proportion mode is selected, the line Llr indicates a relationship between the acceleration pedal manipulation amount and the hybrid system power when the large proportion mode is selected, the acceleration manipulation amount AP1 indicates the predetermined small manipulation amount, the acceleration manipulation amount AP2 indicates the predetermined large manipulation amount, the hybrid system power Psr1 indicates the hybrid system power when the actual acceleration pedal manipulation amount is equal to the predetermined small manipulation amount AP1 in the case that the small proportion mode is selected, the hybrid system power Psl1 indicates the hybrid system power when the actual acceleration pedal manipulation amount is equal to the predetermined small manipulation amount AP1 in the case that the large proportion mode is selected, the hybrid system power Psr2 indicates the hybrid system power when the actual acceleration pedal manipulation amount is equal to the predetermined large manipulation amount AP2 in the case that the small proportion mode is selected and the hybrid system power Plr2 indicates the hybrid system power when the actual acceleration pedal manipulation amount is equal to the predetermined large manipulation amount AP2 in the case that the large proportion mode is selected.

Figure 5:
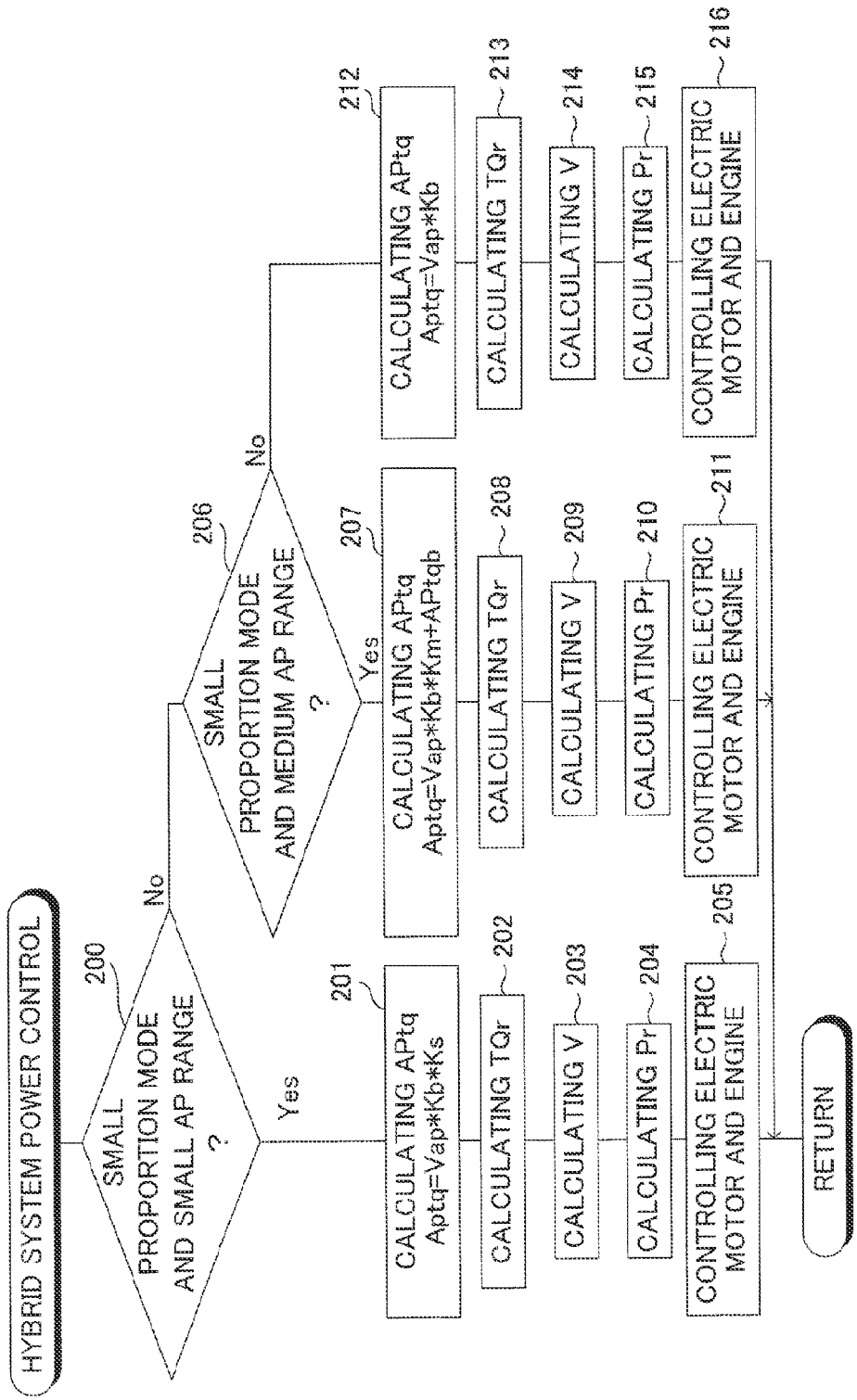
FIG. 5 is a view showing an example of a routine for performing a hybrid system power control according to the second embodiment.

Next, an example of a routine for performing a hybrid system power control according to the second embodiment will be explained. This example of the routine is shown in FIG. 5. This routine starts every a predetermined time has elapsed.

When the routine of FIG. 5 starts, first, at the step 200, it is judged if the small proportion mode is selected and the actual acceleration pedal manipulation amount is within the small acceleration pedal manipulation amount range.

In this regard, when it is judged that the small proportion mode is selected and the actual acceleration pedal manipulation amount is within the small acceleration pedal manipulation amount range, the routine proceeds to the step 201.

On the other hand, when it is judged that the small proportion mode is not selected or the actual acceleration pedal manipulation amount is not within the small acceleration pedal manipulation amount range, the routine proceeds to the step 206.

At the step 206, it is judged if the small proportion mode is selected and the actual acceleration pedal manipulation amount is within the medium acceleration pedal manipulation amount range.

In this regard, when it is judged that the small proportion mode is selected and the actual acceleration pedal manipulation amount is within the medium acceleration pedal manipulation amount range, the routine proceeds to the step 207.

On the other hand, when it is judged that the small proportion mode is not selected or the actual acceleration pedal manipulation amount is not within the medium acceleration pedal manipulation amount range, the routine proceeds to the step 212.

At the step 201, the acceleration pedal manipulation amount APtq for the required torque calculation is calculated according to the following equation 3.

In the equation 3, "Vap" is—output value output from the acceleration pedal manipulation amount sensor—, "Kb" is—transforming coefficient for transforming to the acceleration pedal manipulation amount for the required torque calculation, the output value output from the acceleration pedal manipulation amount sensor when the small proportion mode is not selected or when the actual acceleration pedal manipulation amount is not within the small acceleration pedal manipulation amount range and when the actual acceleration pedal manipulation amount is not within the medium acceleration pedal manipulation amount range—, "Ks" is—correcting value for correcting the output value Vap transformed by the transforming coefficient Kb when the small proportion mode is selected and the actual acceleration pedal manipulation amount is within the small acceleration pedal manipulation amount range—and this correcting coefficient is larger than "1".

$$APtq = Vap * Kb * Ks \qquad (3)$$

Next, at the step 202, the required torque TQr is calculated on the basis of the acceleration pedal manipulation amount APtq for the required torque calculation calculated at the step 201.

Next, at the step 203, the vehicle speed V is calculated.

Next, at the step 204, the required hybrid system power value Pr is calculated on the basis of the required torque TQr calculated at the step 202 and the vehicle speed V calculated at the step 203.

Next, at the step 205, the electric motor and the engine are controlled such that the power of the required hybrid system power value Pr calculated at the step 204 is output from the hybrid system and thereafter, the routine ends.

At the step 207, the acceleration pedal manipulation amount APtq for the required torque calculation is calculated according to the following equation 4.

In the equation 4, "Vap" is the same as—Vap—in the equation 3, "Kb" is the same as—Kb—in the equation 3, "Km" is—a correcting coefficient for correcting the output value Vap transformed by the transforming coefficient when the small proportion mode is selected and the actual acceleration pedal manipulation amount is within the medium acceleration pedal manipulation amount range—, this correcting coefficient is smaller than "1", "APtqb" is—a constant—and this constant is larger than "0".

$$APtq = Vap*Kb*Km + APtqb \tag{4}$$

Next, at the step 208, the required torque TQr is calculated on the basis of the acceleration pedal manipulation amount APtq for the required torque calculation calculated at the step 207.

Next, at the step 209, the vehicle speed V is calculated.

Next, at the step 210, the required hybrid system power value Pr is calculated on the basis of the required torque TQr calculated at the step 208 and the vehicle speed V calculated at the step 209.

Next, at the step 211, the electric motor is controlled such that the power of the required hybrid system power value Pr calculated at the step 210 is output from the hybrid system and thereafter, the routine ends.

At the step 212, the acceleration pedal manipulation amount APtq for the required torque calculation is calculated according to the following equation 5.

In the equation 5, "Vap" is the same as—Vap—in the equation 3 and "Kb" is the same as—Kb—in the equation 3.

Further, the acceleration pedal manipulation amount APtq for the required torque calculation calculated according to the equation 5 is equal to the actual acceleration pedal manipulation amount.

$$APtq = Vap*Kb \tag{5}$$

Next, at the step 213, the required torque TQr is calculated on the basis of the acceleration pedal manipulation amount APtq for the required torque calculation calculated at the step 512.

Next, at the step 214, the vehicle speed V is calculated.

Next, at the step 215, the required hybrid system power value Pr is calculated on the basis of the required torque TQr calculated at the step 213 and the vehicle speed V calculated at the step 214.

Next, at the step 216, the electric motor is controlled such that the power of the required hybrid system power value Pr calculated at the step 215 is output from the hybrid system and thereafter, the routine ends.

Next, the third embodiment will be explained. The constitution and control of the third embodiment not explained below are the same as those of the aforementioned embodiments or those introduced from the constitution and control of the aforementioned embodiments in consideration of the constitution and control of the third embodiment explained below.

Further, in the following explanation, the "required electric motor power value" means—the power value required as the power output from the electric motor—.

In the third embodiment, in the case that the small proportion mode is selected and the required electric motor power value is larger than a predetermined electric motor power value (hereinafter, this value may be referred to as—predetermined electric motor power value—), even when the actual acceleration pedal manipulation amount is smaller than the predetermined small manipulation amount, the hybrid system power increase amount is made equal to that in the case that the large proportion mode is selected.

On the other hand, in the third embodiment, in the case that the small proportion mode is selected and the required electric motor power value is equal to or smaller than the predetermined electric motor power value, when the actual acceleration pedal manipulation amount is smaller than the predetermined small manipulation amount, the hybrid system power increase amount is made larger than that in the case that the large proportion mode is selected.

According to the third embodiment, the following effect can be obtained.

That is, if the increase rate of the required power value is large when the required electric motor power value is relatively large at the small proportion mode being selected, there is a possibility that the load imposed on the electric motor excessively increases and this is not preferred in the point of view of the protection of the electric motor.

In this regard, in the third embodiment, when the required electric motor power value is relatively large, the hybrid system power increase amount within the small acceleration pedal manipulation amount range at the small proportion mode being selected is equal to that at the large proportion mode being selected.

Thus, according to the third embodiment, the effect that the excessive large load imposed on the electric motor is restricted when the required electric motor power value is relatively large at the small proportion mode being selected can be obtained.

Figure 6:
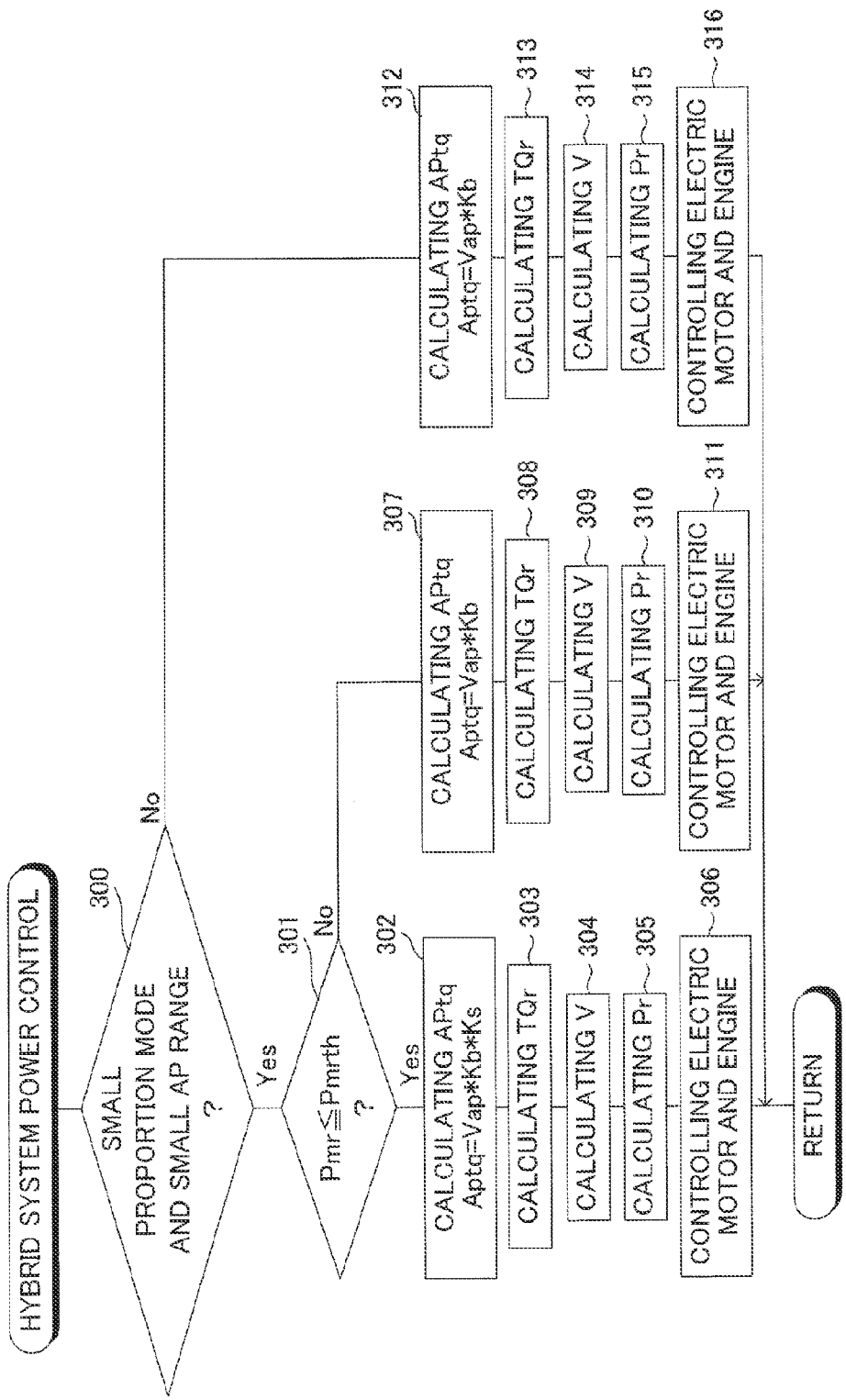
FIG. 6 is a view showing an example of a routine for performing a hybrid system power control according to a third embodiment.

Next, an example of a routine for performing a hybrid system power control according to the third embodiment will be explained. This example of the routine is shown in FIG. 6. This routine starts every a predetermined time has elapsed. The steps 302 to 306 of FIG. 6 are the same as the steps 101 to 105 of FIG. 3, respectively and the steps 312 to 316 of FIG. 6 are the same as the steps 106 to 110 of FIG. 3, respectively and therefore, the explanations of the steps will be omitted.

When the routine of FIG. 6 starts, first, at the step 300, it is judged if the small proportion mode is selected and the actual acceleration pedal manipulation amount is within the small acceleration pedal manipulation amount range.

In this regard, when it is judged that the small proportion mode is selected and the actual acceleration pedal manipulation amount is within the small acceleration pedal manipulation amount range, the routine proceeds to the step 301.

On the other hand, when it is judged that the small proportion mode is not selected or the actual acceleration pedal manipulation amount is not within the small acceleration pedal manipulation amount range, the routine proceeds to the step 312.

At the step 301, it is judged if the required electric motor power value Pmr is equal to or smaller than the predetermined electric motor power value Pmrth (Pmr≤Pmrth).

In this regard, when it is judged that Pmr≤Pmrth, the routine proceeds to the step 302.

On the other hand, when it is not judged that Pmr-Pmrth, the routine proceeds to the step 307.

At the step 307, the acceleration pedal manipulation amount APtq for the required torque calculation is calculated according to the aforementioned equation 2.

Next, at the step 308, the required torque TQr is calculated on the basis of the acceleration pedal manipulation amount APtq for the required torque calculation calculated at the step 307.

Next, at the step 309, the vehicle speed V is calculated.

Next, at the step 310, the required hybrid system power value Pr is calculated on the basis of the required torque TQr calculated at the step 308 and the vehicle speed V calculated at the step 309.

Next, at the step 311, the electric motor is controlled such that the power of the required hybrid system power value Pr calculated at the step 310 is output from the hybrid system and thereafter, the routine ends.

In the aforementioned embodiments, as a condition for changing the hybrid system power increase amount at the small proportion mode being selected to a value different from the hybrid system power increase amount at the large proportion mode being selected, the stop of the engine operation may be additionally employed.

Further, in the aforementioned embodiments, as a condition for changing the hybrid system power increase amount at the small proportion mode being selected to a value different from the hybrid system power increase amount at the large proportion mode being selected and changing the hybrid system power at the small proportion mode being selected to a value different from the hybrid system power at the large proportion mode being selected, the stop of the engine operation may be additionally employed.

Further, in the aforementioned embodiments, in addition to the selective performance of the small and large proportion modes, the normal mode, the power mode and the ecology mode may be selectively performed.

In this case, for example, when the small proportion mode and the normal mode are selected, the power equal to the hybrid system power at the small proportion mode being selected according to the aforementioned embodiments is output from the hybrid system, when the small proportion mode and the power mode are selected, the power larger than the hybrid system power at the small proportion mode being selected according to the aforementioned embodiments is output from the hybrid system, and when the small proportion mode and the ecology mode are selected, the power smaller than the hybrid system power at the small proportion mode being selected according to the aforementioned embodiments is output from the hybrid system.

Further, when the large proportion mode and the normal mode are selected, the power equal to the hybrid system power at the large proportion mode being selected according to the aforementioned embodiments is output from the hybrid system, when the large proportion mode and the power mode are selected, the power larger than the hybrid system power at the large proportion mode being selected according to the aforementioned embodiments is output from the hybrid system, and when the large proportion mode and the ecology mode are selected, the power smaller than the hybrid system power at the large proportion mode being selected according to the aforementioned embodiments is output from the hybrid system.

Next, the fourth embodiment will be explained. The constitution and control of the fourth embodiment not explained below are the same as those of the aforementioned embodiments or those introduced from the constitution and control of the fourth embodiment in consideration of the constitution and control of the aforementioned embodiments explained below.

The hybrid system 10 of the fourth embodiment can output a power output from the engine 11 by its operation and a power output from the electric motor 12 by its operation selectively or simultaneously, and selectively performs a mode for selectively performing the operation of the engine 11 and the stop thereof with the electric motor 12 being operated (hereinafter, this mode may be referred to as—HV mode—) and a mode for performing the operation of the electric motor with the operation of the engine being stopped (hereinafter, this mode may be referred to as—EV mode—).

In the fourth embodiment, in the case that the HV mode is selected, when the operation of the engine 11 is performed with the electric motor 12 being operated, the power output from the electric motor 12 and the power output from the engine 11 are output simultaneously from the hybrid system 10 and on the other hand, when the operation of the engine is stopped with the electric motor 12 being operated, the power output from the electric motor 12 is output from the hybrid system 10.

On the other hand, in the case that the EV mode is selected, the electric motor 12 is operated and the power output from the electric motor 12 is output from the hybrid system 10.

Then, the electronic control unit 16 controls the operations of the electric motor 12 and the engine 11 such that the power of the required hybrid system power value is output from the hybrid system 10 by the powers output from the electric motor 12 and the engine 11 in the case that the HV mode is selected and controls the operation of the electric motor such that the power of the required hybrid system power value is output from the hybrid system 10 by the power output from the electric motor 12 in the case that the EV mode is selected.

Next, a hybrid system power control (i.e a control of the power output from the hybrid system) of the fourth embodiment will be explained. In the following explanation, the "hybrid system power" means—a power output from the hybrid system—and the "hybrid system power increase amount" means—an increase amount of the hybrid system power relative to the increase amount of the actual acceleration pedal manipulation amount—.

In the fourth embodiment, in the case that the EV mode is selected, when the actual acceleration pedal manipulation amount is smaller than a predetermined manipulation amount (hereinafter, this manipulation amount may be referred to as—predetermined small manipulation amount—), the hybrid system power increase amount is made larger than that in the case that the HV mode is selected.

According to the fourth embodiment, the following effect can be obtained.

That is, in the fourth embodiment, when the actual acceleration pedal manipulation amount is within a relatively small range (i.e a range wherein the actual acceleration pedal manipulation amount is smaller than the predetermined small manipulation amount and hereinafter, this range may be referred to as—small acceleration pedal manipulation amount range—) at the EV mode being selected, the hybrid system power increase amount is made larger than that within the small acceleration pedal manipulation amount range at the HV mode being selected (i.e. when the HV mode is selected).

Therefore, in the case that the actual acceleration pedal manipulation amount is increased within a relatively small range (i.e. a range smaller than the predetermined small manipulation amount) at the EV mode being selected, the increase of hybrid system power is large, compared with the case that the actual acceleration pedal manipulation amount is increased at the HV proportion mode being selected.

Thus, according to the fourth embodiment, the effect that the specific torque feeling of the electric motor can be obtained within the small acceleration pedal manipulation amount range at the EV mode being selected, can be obtained.

In addition, according to the fourth embodiment, the following effect can be obtained.

That is, as explained above, according to the fourth embodiment, in the case that the actual acceleration pedal manipulation amount is increased within the relatively small range at the EV mode being selected, the torque is output from the hybrid system at a high increase rate, compared with the case that the actual acceleration pedal manipulation amount is increased at the HV mode being selected.

Thus, it is restricted that the operator of the acceleration pedal feels an shortage of the increase of the torque output from the hybrid system and as a result, it is restricted that the operator of the acceleration pedal further increases the acceleration pedal manipulation amount.

Thus, the effect that it is restricted that the EV mode is switched to the HV mode and therefore, the frequency of the operation of the engine decreases and as a result, it is restricted that the fuel consumption of the engine increases.

In the fourth embodiment, in the case that the EV mode is selected, when the actual acceleration pedal manipulation amount is smaller than the predetermined small manipulation amount, the hybrid system power increase amount may be made larger than that when the HV mode is selected and the hybrid system power may be made larger than that when the HV mode is selected.

Figure 7:
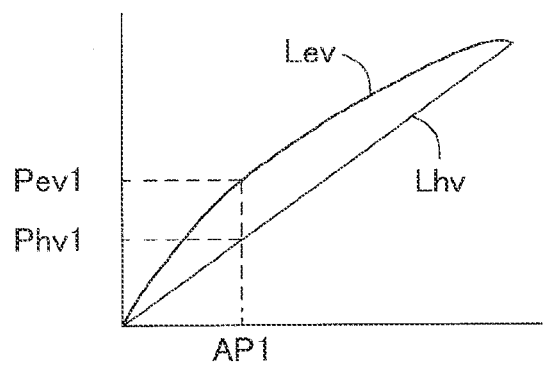
FIG. 7 is a view showing a relationship between an actual acceleration pedal manipulation amount and a hybrid system power in a fourth embodiment.

The relationship between the actual acceleration pedal manipulation amount and the hybrid system power in this case is shown in FIG. 7.

In FIG. 7, the abscissa axis indicates the actual acceleration pedal manipulation amount, the longitudinal axis indicates the hybrid system power, the line Lev indicates a relationship between the actual acceleration pedal manipulation amount and the hybrid system power when the EV mode is selected, the line Lhv indicates a relationship between the acceleration pedal manipulation amount and the hybrid system power when the HV mode is selected, the acceleration manipulation amount AP1 indicates the predetermined small manipulation amount, the hybrid system power Pev1 indicates the hybrid system power when the actual acceleration pedal manipulation amount is equal to the predetermined small manipulation amount AP1 in the case that the EV mode is selected and the hybrid system power Phv1 indicates the hybrid system power when the actual acceleration pedal manipulation amount is equal to the predetermined small manipulation amount AP1 in the case that the HV mode is selected.

Figure 8:
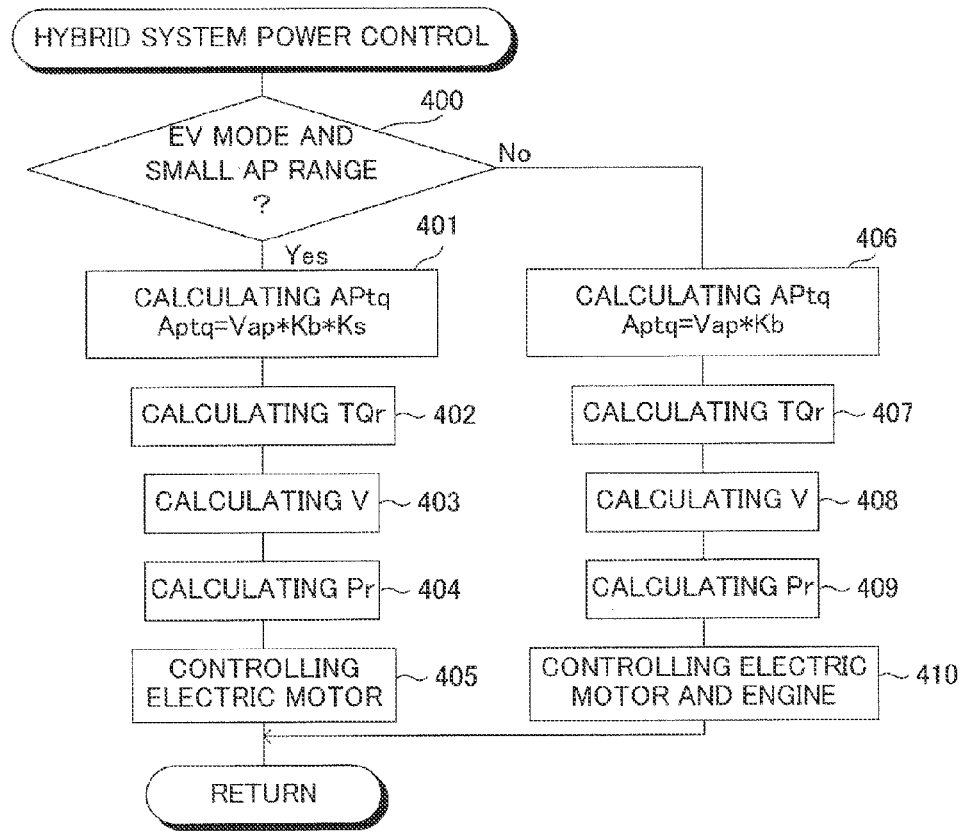
FIG. 8 is a view showing an example of a routine for performing a hybrid system power control according to the fourth embodiment.

Next, an example of a routine for performing a hybrid system power control according to the fourth embodiment will be explained. This example of the routine is shown in FIG. 8. This routine starts every a predetermined time has elapsed. The steps 401 to 404 of FIG. 8 are the same as the steps 101 to 104 of FIG. 3, respectively and the steps 406 to 410 of FIG. 8 are the same as the steps 106 to 110 of FIG. 3, respectively and therefore, the explanations of the steps will be omitted.

When the routine of FIG. 8 starts, first, at the step 400, it is judged if the EV mode is selected and the actual acceleration pedal manipulation amount is within the small acceleration pedal manipulation amount range.

In this regard, when it is judged that the EV mode is selected and the actual acceleration pedal manipulation amount is within the small acceleration pedal manipulation amount range, the routine proceeds to the step 401.

On the other hand, when it is judged that the EV mode is not selected or the actual acceleration pedal manipulation amount is not within the small acceleration pedal manipulation amount range, the routine proceeds to the step 406.

At the step 405, the electric motor is controlled such that the power of the required hybrid system power value Pr calculated at the step 404 is output from the hybrid system and thereafter, the routine ends.

Next, the fifth embodiment will be explained. The constitution and control of the fifth embodiment not explained below are the same as those of the aforementioned embodiments or those introduced from the constitution and control of the fifth embodiment in consideration of the constitution and control of the aforementioned embodiments explained below.

In the fifth embodiment, when the required hybrid system power value is equal to or smaller than a predetermined hybrid system power value (hereinafter, this value may be referred to as—predetermined hybrid system power value—), the EV mode is selected.

On the other hand, when the required hybrid system power value is larger than the predetermined hybrid system power value, the HV mode is selected.

Further, in the fifth embodiment, in the case that the EV mode is selected, when the actual acceleration pedal manipulation amount is smaller than the predetermined small manipulation amount, the hybrid system power increase amount is made larger than that in the case that the HV mode is selected.

Further, in the fifth embodiment, in the case that the EV mode is selected, when the actual acceleration pedal manipulation amount is equal to or larger than the predetermined small manipulation amount and is smaller than a manipulation amount (hereinafter, this amount may be referred to as—predetermined large manipulation amount—) smaller than the maximum value of the actual acceleration pedal manipulation amount (i.e. the possible maximum value of the actual acceleration pedal manipulation amount), the hybrid system power increase amount is made smaller than that in the case that the HV mode is selected and the hybrid system power at around the predetermined large manipulation amount is made smaller than that at the HV mode being selected.

According to the fifth embodiment, the following effect can be obtained in addition to the effect explained relating to the fourth embodiment.

That is, in the fifth embodiment, when the actual acceleration pedal manipulation amount is within a medium degree range (i.e. a range wherein the actual acceleration pedal manipulation amount is larger than or equal to the predetermined small manipulation amount and smaller than the predetermined large manipulation amount and hereinafter, this range may be referred to as—medium acceleration pedal manipulation amount range—) at the EV mode being selected, the hybrid system power increase amount is made smaller than that within the medium acceleration pedal manipulation amount range at the HV mode being selected and the hybrid system power at around the predetermined large manipulation amount is smaller than that at around the predetermined large manipulation amount within the medium acceleration pedal manipulation amount range at the HV mode being selected.

Therefore, even if the actual acceleration pedal manipulation amount is increased within a medium degree range (i.e. a range from an amount equal to or larger than the predetermined small manipulation amount to an amount smaller than the predetermined large manipulation amount) at the EV mode being selected, the required hybrid system power value does not easily become larger than the predetermined hybrid system power value and as a result, the EV mode is not easily switched to the HV mode.

Thus, according to the fifth embodiment, the effect that the selection of the EV mode is easily maintained at the EV mode being selected can be obtained.

In the fifth embodiment, in the case that the EV mode is selected, when the actual acceleration pedal manipulation amount is within the medium acceleration pedal manipulation amount range, the hybrid system power increase amount may be made smaller than that within the medium acceleration pedal manipulation amount range in the case that the HV mode is selected, the hybrid system power at around the predetermined large manipulation amount may be made smaller than that at around the predetermined large manipulation amount within the medium acceleration pedal manipulation amount range at the HV mode being selected, and the hybrid system power at around the predetermined small manipulation amount may be made larger than that at around the predetermined small manipulation amount within the medium acceleration pedal manipulation amount range at the HV mode being selected.

Further, in the fifth embodiment, in the case that the EV mode is selected, when the actual acceleration pedal manipulation amount is within a relatively large range (i.e. a range wherein the actual acceleration pedal manipulation amount is equal to or larger than the predetermined large manipulation amount and hereinafter, this range may be referred to as—large acceleration pedal manipulation amount range—), the hybrid system power increase amount may be made larger than that within the large acceleration pedal manipulation amount range in the case that the HV mode is selected, the hybrid system power may be made smaller than that corresponding to the same acceleration pedal amount at the HV mode being selected and the hybrid system power when the actual acceleration pedal manipulation amount reaches its maximum value may be made equal to that corresponding to the same acceleration pedal manipulation amount at the HV mode being selected.

Figure 9:
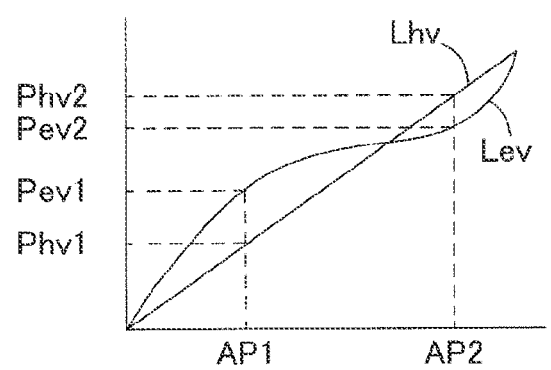
FIG. 9 is a view showing a relationship between an actual acceleration pedal manipulation amount and a hybrid system power in a fifth embodiment.

The relationship between the actual acceleration pedal manipulation amount and the hybrid system power in this case is shown in FIG. 9.

In FIG. 9, the abscissa axis indicates the actual acceleration pedal manipulation amount, the longitudinal axis indicates the hybrid system power, the line Lev indicates a relationship between the actual acceleration pedal manipulation amount and the hybrid system power when the EV mode is selected, the line Lhv indicates a relationship between the acceleration pedal manipulation amount and the hybrid system power when the HV mode is selected, the acceleration manipulation amount AP1 indicates the predetermined small manipulation amount, the acceleration manipulation amount AP2 indicates the predetermined large manipulation amount, the hybrid system power Pev1 indicates the hybrid system power when the actual acceleration pedal manipulation amount is equal to the predetermined small manipulation amount AP1 in the case that the EV mode is selected, the hybrid system power Phv1 indicates the hybrid system power when the actual acceleration pedal manipulation amount is equal to the predetermined small manipulation amount AP1 in the case that the HV mode is selected, the hybrid system power Pev2 indicates the hybrid system power when the actual acceleration pedal manipulation amount is equal to the predetermined large manipulation amount AP2 in the case that the EV mode is selected and the hybrid system power Phv2 indicates the hybrid system power when the actual acceleration pedal manipulation amount is equal to the predetermined large manipulation amount AP2 in the case that the HV mode is selected.

Figure 10:
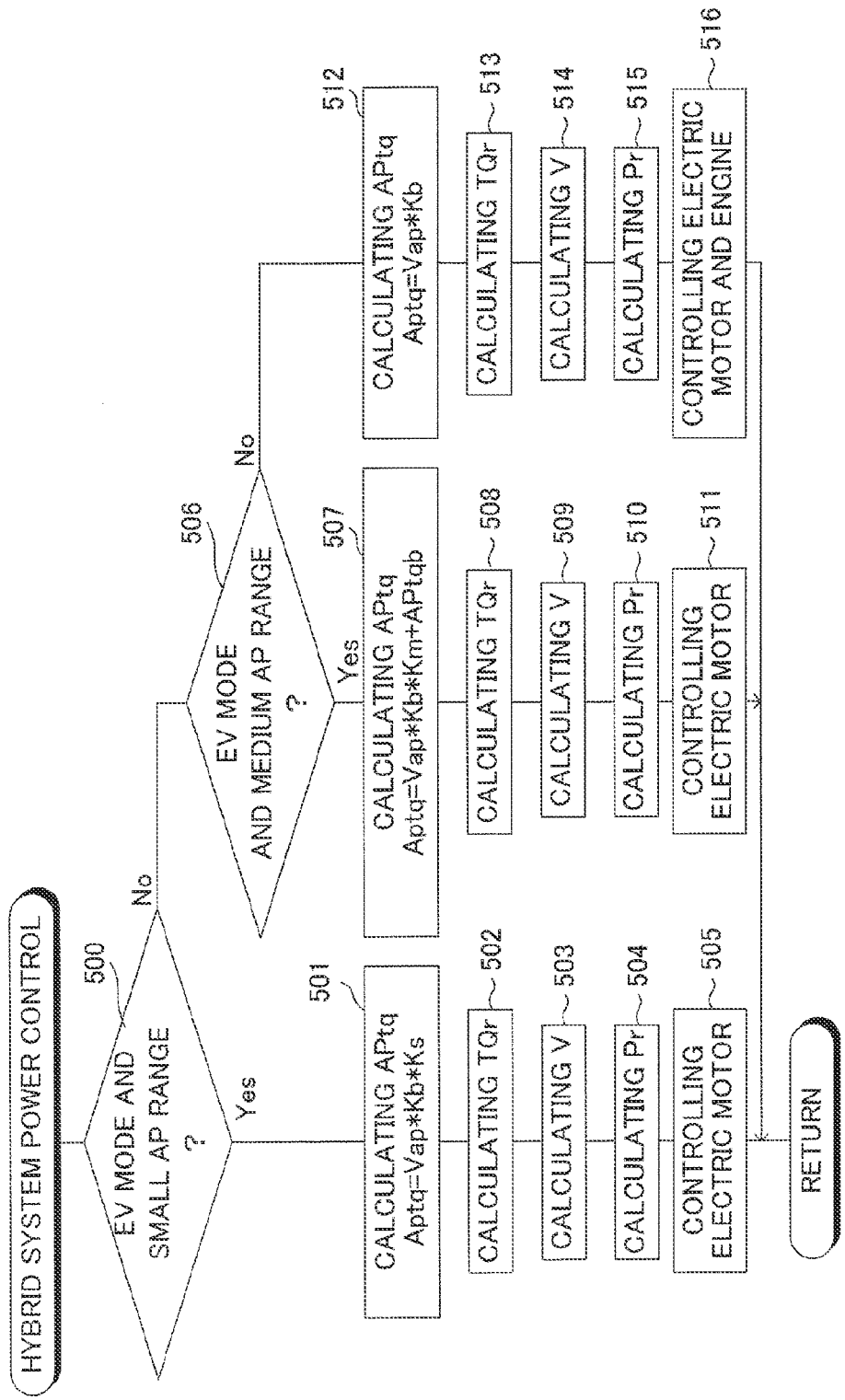
FIG. 10 is a view showing an example of a routine for performing a hybrid system power control according to the fifth embodiment.

Next, an example of a routine for performing a hybrid system power control according to the fifth embodiment will be explained. This example of the routine is shown in FIG. 10. This routine starts every a predetermined time has elapsed. The steps 501 to 504 of FIG. 10 are the same as the steps 201 to 204 of FIG. 5, respectively, the steps 507 to 510 of FIG. 10 are the same as the steps 207 to 210 of FIG. 5, respectively and the steps 512 to 516 of FIG. 10 are the same as the steps 212 to 216 of FIG. 3, respectively and therefore, the explanations of the steps will be omitted.

When the routine of FIG. 10 starts, first, at the step 500, it is judged if the EV mode is selected and the actual acceleration pedal manipulation amount is within the small acceleration pedal manipulation amount range.

In this regard, when it is judged that the EV mode is selected and the actual acceleration pedal manipulation amount is within the small acceleration pedal manipulation amount range, the routine proceeds to the step 501.

On the other hand, when it is judged that the EV mode is not selected or the actual acceleration pedal manipulation amount is not within the small acceleration pedal manipulation amount range, the routine proceeds to the step 506.

At the step 506, it is judged if the EV mode is selected and the actual acceleration pedal manipulation amount is within the medium acceleration pedal manipulation amount range.

In this regard, when it is judged that the EV mode is selected and the actual acceleration pedal manipulation amount is within the medium acceleration pedal manipulation amount range, the routine proceeds to the step 507.

On the other hand, when it is judged that the EV mode is not selected or the actual acceleration pedal manipulation amount is not within the medium acceleration pedal manipulation amount range, the routine proceeds to the step 512.

At the step 505, the electric motor is controlled such that the power of the required hybrid system power value Pr calculated at the step 504 is output from the hybrid system and thereafter, the routine ends.

At the step 511, the electric motor is controlled such that the power of the required hybrid system power value Pr calculated at the step 510 is output from the hybrid system and thereafter, the routine ends.

Next, the sixth embodiment will be explained. The constitution and control of the sixth embodiment not explained below are the same as those of the aforementioned embodiments or those introduced from the constitution and control of the aforementioned embodiments in consideration of the constitution and control of the sixth embodiment explained below.

Further, in the following explanation, the "required electric motor power value" means—the power value required as the power output from the electric motor—.

In the sixth embodiment, in the case that the EV mode is selected and the required electric motor power value is larger than a predetermined electric motor power value (hereinafter, this value may be referred to as—predetermined electric motor power value—), even when the actual acceleration pedal manipulation amount is smaller than the predetermined small manipulation amount, the hybrid system power increase amount is made equal to that in the case that the HV mode is selected.

On the other hand, in the sixth embodiment, in the case that the EV mode is selected and the required electric motor power value is equal to or smaller than the predetermined electric motor power value, when the actual acceleration pedal manipulation amount is smaller than the predetermined small manipulation amount, the hybrid system power increase amount is made larger than that in the case that the HV mode is selected.

According to the sixth embodiment, the following effect can be obtained.

That is, if the increase rate of the required power value is large when the required electric motor power value is relatively large at the EV mode being selected, there is a possibility that the load imposed on the electric motor excessively increases and this is not preferred in the point of view of the protection of the electric motor.

In this regard, in the sixth embodiment, when the required electric motor power value is relatively large, the hybrid system power increase amount within the small acceleration pedal manipulation amount range at the EV mode being selected is equal to that at the HV mode being selected.

Thus, according to the sixth embodiment, the effect that the excessive large load imposed on the electric motor is restricted when the required electric motor power value is relatively large at the EV mode being selected can be obtained.

Figure 11:
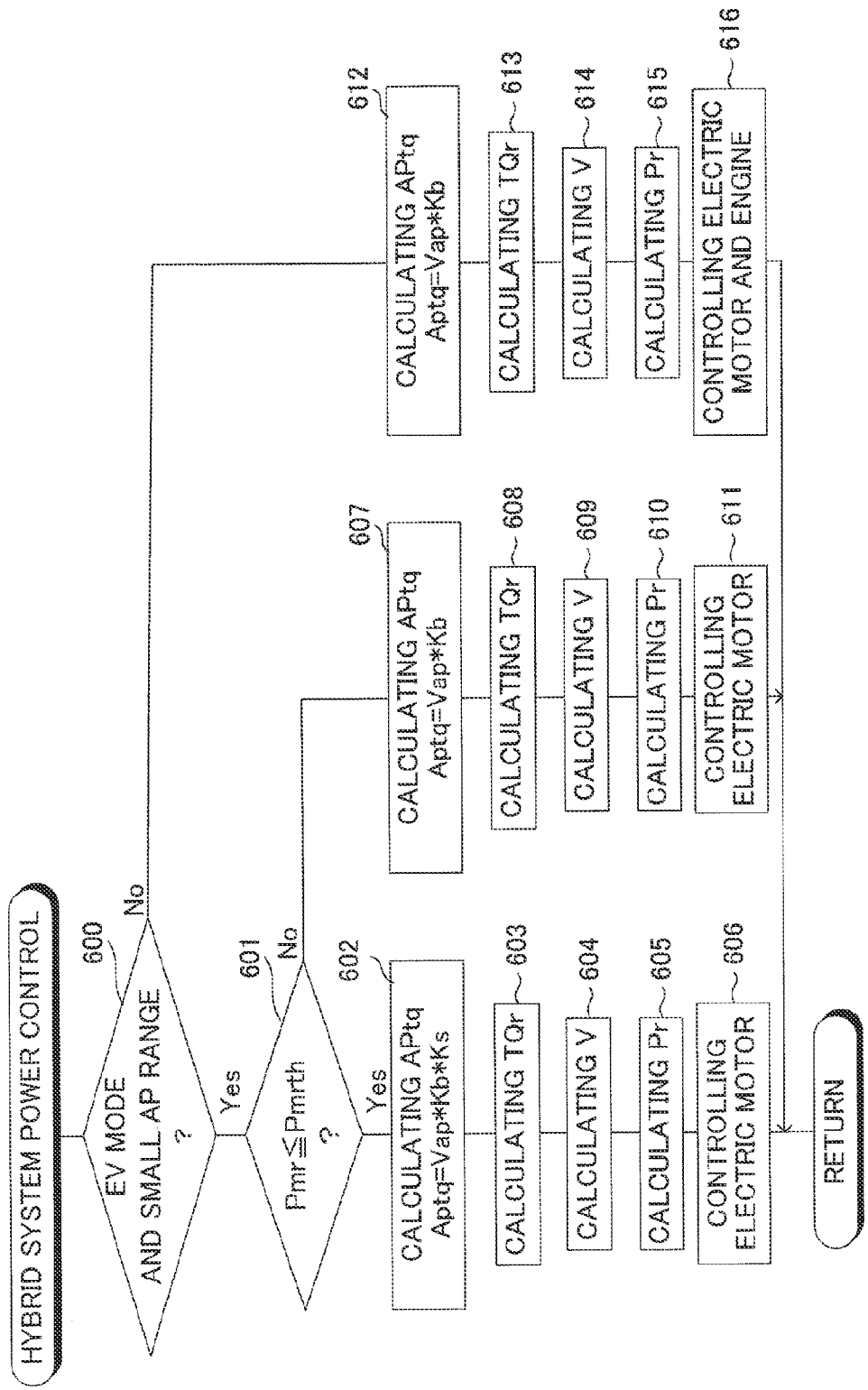
FIG. 11 is a view showing an example of a routine for performing a hybrid system power control according to a sixth embodiment.

Next, an example of a routine for performing a hybrid system power control according to the sixth embodiment will be explained. This example of the routine is shown in FIG. 11. This routine starts every a predetermined time has elapsed. The steps 601 to 605 of FIG. 11 are the same as the steps 301 to 305 of FIG. 6, respectively, the steps 607 to 610 of FIG. 11 are the same as the steps 307 to 310 of FIG. 6, respectively and the steps 612 to 616 of FIG. 11 are the same as the steps 312 to 316 of FIG. 6, respectively and therefore, the explanations of the steps will be omitted.

When the routine of FIG. 11 starts, first, at the step 600, it is judged if the EV mode is selected and the actual acceleration pedal manipulation amount is within the small acceleration pedal manipulation amount range.

In this regard, when it is judged that the EV mode is selected and the actual acceleration pedal manipulation amount is within the small acceleration pedal manipulation amount range, the routine proceeds to the step 601.

On the other hand, when it is judged that the EV mode is not selected or the actual acceleration pedal manipulation amount is not within the small acceleration pedal manipulation amount range, the routine proceeds to the step 612.

At the step 606, the electric motor is controlled such that the power of the required hybrid system power value Pr calculated at the step 605 is output from the hybrid system and thereafter, the routine ends.

At the step 611, the electric motor is controlled such that the power of the required hybrid system power value Pr calculated at the step 610 is output from the hybrid system and thereafter, the routine ends.

In the aforementioned embodiments, as a condition for changing the hybrid system power increase amount at the EV mode being selected to a value different from the hybrid system power increase amount at the HV mode being selected, the stop of the engine operation may be additionally employed.

Further, in the aforementioned embodiments, as a condition for changing the hybrid system power increase amount at the EV mode being selected to a value different from the hybrid system power increase amount at the HV mode being selected and changing the hybrid system power at the EV mode being selected to a value different from the hybrid system power at the HV mode being selected, the stop of the engine operation may be additionally employed.

Further, in the aforementioned embodiments, in addition to the selective performance of the EV and HV modes, the normal mode, the power mode and the ecology mode may be selectively performed.

In this case, for example, when the EV mode and the normal mode are selected, the power equal to the hybrid system power at the EV mode being selected according to the aforementioned embodiments is output from the hybrid system, when the EV mode and the power mode are selected, the power larger than the hybrid system power at the EV mode being selected according to the aforementioned embodiments is output from the hybrid system, and when the EV mode and the ecology mode are selected, the power smaller than the hybrid system power at the EV mode being selected according to the aforementioned embodiments is output from the hybrid system.

Further, when the HV mode and the normal mode are selected, the power equal to the hybrid system power at the HV mode being selected according to the aforementioned embodiments is output from the hybrid system, when the HV mode and the power mode are selected, the power larger than the hybrid system power at the HV mode being selected according to the aforementioned embodiments is output from the hybrid system, and when the HV mode and the ecology mode are selected, the power smaller than the hybrid system power at the HV mode being selected according to the aforementioned embodiments is output from the hybrid system.

Further, in the aforementioned embodiments, as a parameter for determining whether the EV or HV mode should be selected, a parameter other than the required hybrid system power value may be employed, for example, the condition of the battery for supplying the power to the electric motor, the condition surrounding the hybrid system or information from the navigation system of the vehicle in the case that the hybrid system is mounted on the vehicle may be employed.

Further, the selection of the EV or HV mode may be selected by the user of the vehicle.

The invention claimed is:

1. A control device of a hybrid system comprising:
an internal combustion engine; and
an electric motor,
the hybrid system can output a power output from the engine by operation of the engine and a power output from the electric motor by operation of the electric motor selectively or simultaneously,
the control device comprising an electronic control unit programmed to selectively perform first and second modes for concomitantly using an EV mode for performing the operation of the electric motor while stopping the operation of the engine and an HV mode for selectively performing the operation of the engine and stop of the operation of the engine while operating the electric motor by switching the EV mode and the HV mode according to a predetermined switching condition set such that a proportion of an operation time of the engine occupying a total time of the first mode is smaller than a proportion of the operation time of the engine occupying a total time of the second mode,
wherein the electronic control unit is programmed to control an increase amount of a power output from the hybrid system relative to an increase amount of an actual acceleration pedal manipulation amount such that the increase amount of the power output from the hybrid system relative to the increase amount of the actual acceleration pedal manipulation amount when the first mode is selected and the actual acceleration pedal manipulation amount is smaller than a predetermined first manipulation amount, is larger than the increase amount of the power output from the hybrid system relative to the increase amount of the actual acceleration pedal manipulation amount when the second mode is selected and the actual acceleration pedal manipulation amount is smaller than the predetermined first manipulation amount.

2. The control device of the hybrid system of claim 1, wherein the electronic control unit is programmed to control the increase amount of the power output from the hybrid system relative to the increase amount of the actual acceleration pedal manipulation amount such that the increase amount of the power output from the hybrid system relative to the increase amount of the actual acceleration pedal manipulation amount when the EV mode is selected at the first mode of the actual acceleration pedal manipulation amount is smaller than the predetermined first manipulation amount, is equal to the increase amount of the power output from the hybrid system relative to the increase amount of the actual acceleration pedal manipulation amount when the HV mode is selected at the first mode and the actual acceleration pedal manipulation amount is smaller than the predetermined first manipulation amount.

3. The control device of the hybrid system of claim 1, wherein the electronic control unit is programmed to:
  select the first mode when a value of a power required to be output from the hybrid system is smaller than or equal to a predetermined first power value;
  select the second mode when the value of the power required to be output from the hybrid system is larger than the predetermined first power value;
  control the increase amount of the power output from the hybrid system relative to the increase amount of the actual acceleration pedal manipulation amount such that the increase amount of the power output from the hybrid system relative to the increase amount of the actual acceleration pedal manipulation amount when the first mode is selected and the actual acceleration pedal manipulation amount is larger than or equal to the predetermined first manipulation amount and is smaller than a predetermined second manipulation amount smaller than a maximum value of the actual acceleration pedal manipulation amount, is smaller than the increase amount of the power output from the hybrid system relative to the increase amount of the actual acceleration pedal manipulation amount when the second mode is selected and the actual acceleration pedal manipulation amount is larger than or equal to the predetermined first manipulation amount and is smaller than the predetermined second manipulation amount; and
  control the power output from the hybrid system such that the power output from the hybrid system when the first mode is selected and the actual acceleration pedal manipulation amount is around the predetermined second manipulation amount, is smaller than the power output from the hybrid system when the second mode is selected and the actual acceleration pedal manipulation amount is around the predetermined second manipulation amount.

4. The control device of the hybrid system of claim 1, wherein the electronic control unit is programmed to control the increase amount of the power output from the hybrid system relative to the increase amount of the actual acceleration pedal manipulation amount such that the increase amount of the power output from the hybrid system relative to the increase amount of the actual acceleration pedal manipulation amount when a value of a power required to be output from the electric motor is larger than a predetermined second power value, the first mode is selected and the actual acceleration pedal manipulation amount is smaller than the predetermined first manipulation amount is equal to the increase amount of the power output from the hybrid system relative to the increase amount of the actual acceleration pedal manipulation am mint when the value of the power required to be output from the electric motor is larger than the predetermined second power value, the second mode is selected and the actual acceleration pedal manipulation amount is smaller than the predetermined first manipulation amount.

5. The control device of the hybrid system of claim 1, wherein the electronic control unit is programmed to control the power output from the hybrid system such that the power output from the hybrid system when the first mode is selected and the actual acceleration pedal manipulation amount is smaller than the predetermined first manipulation amount, is larger than the power output from the hybrid system when the second mode is selected and the actual acceleration pedal manipulation amount is smaller than the predetermined first manipulation amount.

6. A control device of a hybrid system comprising:
  an internal combustion engine; and
  the hybrid system can output a power output from the engine by operation of the engine and a power output from the electric motor by operation of the electric motor selectively or simultaneously,
  the control device comprising an electronic control unit programmed to selectively perform an EV mode for performing the operation of the electric motor while stopping the operation of the engine and an HV mode for selectively performing the operation of the engine and stop of the operation of the engine while operating the electric motor,
  the electronic control unit is programmed to control an increase amount of a power output from the hybrid system relative to an increase amount of an actual acceleration pedal manipulation amount such that the increase amount of the power output from the hybrid system relative to the increase amount of the actual acceleration pedal manipulation amount when the EV mode is selected and the actual acceleration pedal manipulation amount is smaller than a predetermined first manipulation amount, is larger than the increase amount of the power output from the hybrid system relative to the increase amount of the actual acceleration pedal manipulation amount when the HV mode is selected and the actual acceleration pedal manipulation amount is smaller than the predetermined first manipulation amount.

7. The control device of the hybrid system of claim 6, wherein the electronic control unit is programmed to:
  select the EV mode when a value of a power required to be output from the hybrid system is smaller than or equal to a predetermined first power value;
  select the HV mode when the value of the power required to be output from the hybrid system is larger than the predetermined first power value;
  control the increase amount of the power output from the hybrid system relative to the increase amount of the actual acceleration pedal manipulation amount such that the increase amount of the power output from the hybrid system relative to the increase amount of the actual acceleration pedal manipulation amount when the EV mode is selected and the actual acceleration pedal manipulation amount is larger than or equal to the predetermined first manipulation amount and is smaller than a predetermined second manipulation amount smaller than a maximum value of the actual acceleration pedal manipulation amount, is smaller than the increase amount of the power output from the hybrid system relative to the increase amount of the actual acceleration pedal manipulation amount when the HV mode is selected and the actual acceleration pedal manipulation amount is larger than or equal to the predetermined first manipulation amount and is smaller than the predetermined second manipulation amount; and control the power output from the hybrid system such that the power output from the hybrid system when the EV mode is selected and the actual acceleration pedal manipulation amount is around the predetermined second manipulation amount, is smaller than the power output from the hybrid system when the HV mode is selected and the actual acceleration pedal manipulation amount is around the predetermined second manipulation amount.

8. The control device of the hybrid system of claim 6, wherein the electronic control unit is programmed to control the increase amount of the power output from the hybrid system relative to the increase amount of the actual acceleration pedal manipulation amount such that the increase amount of the power output from the hybrid system relative to the increase amount of the actual acceleration pedal manipulation amount when a value of a power required to be output from the electric motor is larger than a predetermined second power value, the EV mode is selected and the actual acceleration pedal manipulation amount is smaller than the predetermined first manipulation amount, is equal to the increase amount of the power output from the hybrid system relative to the increase amount of the actual acceleration pedal manipulation amount when the value of the power required to be output from the electric motor is larger than the predetermined second power value, the HV mode is selected and the actual acceleration pedal manipulation amount is smaller than the predetermined first manipulation amount.

9. The control device of the hybrid system of claim 6, wherein the electronic control unit is programmed to control the power output from the hybrid system such that the power output from the hybrid system when the EV mode is selected and the actual acceleration pedal manipulation amount is smaller than the predetermined first manipulation amount, is larger than the power output from the hybrid system when the HV mode is selected and the actual acceleration pedal manipulation amount is smaller than the predetermined first manipulation amount.

* * * * *